United States Patent [19]

Davis et al.

[11] Patent Number: 4,996,255

[45] Date of Patent: Feb. 26, 1991

[54] FLAME RETARDANT, HALOGEN FREE AROMATIC POLYCARBONATE COPOLYMER BLENDS

[75] Inventors: Gary C. Davis, Albany; Larry N. Lewis, Scotia, both of N.Y.

[73] Assignee: General Electric Company, Schenectady, N.Y.

[21] Appl. No.: 399,096

[22] Filed: Aug. 28, 1989

[51] Int. Cl.$^5$ .............................................. C08K 5/54
[52] U.S. Cl. ................................ 524/261; 524/266; 524/268
[58] Field of Search ................ 524/261, 266, 268

[56] References Cited

U.S. PATENT DOCUMENTS

| | | | |
|---|---|---|---|
| 3,971,756 | 7/1976 | Bialous et al. | 524/262 |
| 4,138,379 | 2/1979 | Scott et al. | 524/265 |
| 4,148,773 | 4/1979 | Mark | 524/261 |
| 4,197,384 | 4/1980 | Bialous et al. | 524/261 |
| 4,305,856 | 12/1981 | Sakano et al. | 524/263 |
| 4,375,525 | 3/1983 | Idel et al. | 524/264 |
| 4,387,176 | 6/1983 | Frye | 524/268 |
| 4,417,018 | 11/1983 | Ogawa et al. | 524/264 |
| 4,476,267 | 10/1984 | Barda et al. | 524/261 |
| 4,663,374 | 5/1987 | Sonoda | 524/261 |

*Primary Examiner*—Veronica P. Hoke
*Attorney, Agent, or Firm*—William A. Teoli; James C. Davis, Jr.; William H. Pittman

[57] ABSTRACT

Flame retardant halogen-free aromatic polycarbonate copolymer blends are provided of certain triarylsilicon materials, such as hexaphenyldisiloxane with an aromatic polycarbonate copolymer which includes polyester carbonates having condensed silphenylenecarbonyl units. The aromatic polycarbonate blends can be injection molded at thicknesses of 1/16" to provide thermoplastics capable of satisfying the V-O requirements of the UL-94 test.

6 Claims, No Drawings

United States Patent Office

PTO - BOYERS, PA Duty Station

MISSING PAGE TEMPORARY NOTICE

PATENT # 4966255     FOR ISSUE DATE 2-26-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 1 - 2

Data Conversion Operation
Boyers, Pa

Aromatic polyester siloxane polycarbonate block copolymers having chemically combined units of formula (1) can be made by effecting reaction between a dihydric phenol of the formula

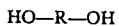
HO—R—OH  (3)

and an aroyl halide-terminated polydiorganosiloxane having the formula

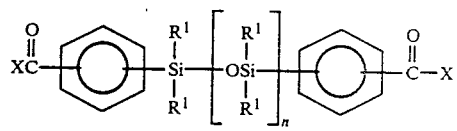

in the presence of an acid acceptor, such as a triarylamine and organic solvent followed by phosgenating the resulting mixture to produce a polyestercarbonate siloxane, where R is a $C_{(6-3)}$ divalent aromatic hydrocarbon radical, $R^1$ is selected from $C_{(1-13)}$ monovalent hydrocarbon radical and $C_{(1-13)}$ monovalent hydrocarbon radicals substituted with radicals inert during equilibration or condensation, and n is an integer equal to 1 to 100 inclusive and preferably 1 to 10 inclusive, and X is a halogen radical, such as chloro.

In addition to the above-described aroyl halide-terminated polydiorganosiloxanes of formula (4), there also can be used in the practice of the present invention, bisphenols of the formula

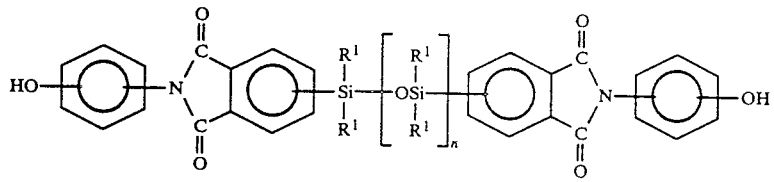

where $R^1$ and n are as previously defined. The aroyl halide-terminated polydiorganosiloxanes of formula (4) and the phthalimide phenol-terminated polydiorganosiloxanes of formula (5) and methods for making are shown respectively in copending applications Ser. Nos. 07/319,025, filed Mar. 6, 1989 and 07/319,027, filed Mar. 6, 1989 which are incorporated herein by reference.

The triarylsilicon materials which can be utilized in combination with the aromatic polycarbonate copolymers used in the practice of the present invention to provide injection moldable thermoplastic flame retardant materials capable of passing the UL-94 flame retardant test at V-O at 1/16" thickness are triarylsilicon materials included by the formula

$(R^2)_3SiY$  (6)

where $R^2$ is selected from $C_{(6-13)}$ monovalent aromatic organic radicals and Y is a member selected from —$C_2H_3$, OH, $Si(R^2)_3$ and —$OSi(R^2)_3$. An effective amount of the triarylsilicon material which can be employed in the practice of the present invention is 4% to 5% by weight of the triarylsilicon material based on the weight of flame retardant aromatic copolycarbonate copolymer blend and preferably from 4% to 5% by weight. Some of these triarylsilicon materials are, for example, hexaphenyldisiloxane, triphenylvinylsilane, and triphenylsilanol. There is also contemplated in addition to the triarylsilicon materials of formula (6), the use of tetraphenyl silane as an effective flame retardant additive.

There are included within the dihydric phenols of formula (3) compounds, such as p,p'bisphenol A, m,p-bisphenol A, o,p-bisphenol A, spirobiindane bisphenol, tetramethylbisphenol A and tetramethylbiphenol.

In the practice of the present invention, the flame retardant halogen-free aromatic polycarbonate copolymer blends can be made by dry blending the aromatic polycarbonate copolymer with the arylsilicon material of formula (6). In particular instances, a branched aliphatic alcohol such as isobutanol can be added to facilitate the blending of the ingredients. However, in most instances melt blending can be effected at temperatures in the range of from 200° C. to 350° C.

The flame retardant halogen-free aromatic polycarbonate copolymer blends of the present invention also can be reinforced with inert fillers such as silica filler, carbon fibers or glass fibers. The proportion of filler which can be utilized can vary from 1 to 100 parts of filler per 100 parts of the resulting aromatic polycarbonate copolymer composition by weight.

In order that those skilled in the art will be better able to practice the present invention, the following example is given by way of illustration and not by way of limitation. All parts are by weight unless otherwise indicated.

EXAMPLE

A polyestercarbonate copolymer having about 1.7 mole % of silphenylenecarbonyl units of formula (1) was prepared by reacting 47.04 grams of 1,2-bis(4-benzoylchloro)-1,1,2,2-tetramethyldisiloxane with 1299.6 grams of bisphenol A in 15.0 liters of methylene chloride containing 24.24 grams of triethylamine. After stirring for 30 minutes, 12.0 liters of water and 33.0 grams of p-cumylphenol chainstopper was added and the vigorously stirred mixture was treated with 657 grams of phosgene maintaining the pH between 9 and 11. The methylene chloride layer was washed with dilute HCl washed with water, precipitated into isopropanol and dried. Based on the method of preparation, the copolymer had 1.7 mole % formula (1) units incorporated with a $M_n$ of 19,800. The polyestercarbonate was extruded and injection molded into 1/16" test slabs. It was found that the test slab failed the UL-94 test because of flaming drip on the first burn.

A dry blend of 350 grams of the above polyestercarbonate copolymer and 18.4 grams of hexaphenyldisiloxane was prepared by agitating a mixture of the materials which were in finely divided form. There was obtained a dry blend having 5% by weight of the hexaphenyldisiloxane based on the weight of the blend. The blend was extruded and injection molded into 1/16" flame bars. The resulting bars were transparent and provided a V-O rating with average flame out times of 1.6 seconds with the first burn and 5.2 seconds with the second burn, an average of 3.3 seconds with both burns.

A 5 weight % blend of the hexaphenyldisiloxane with Lexan 140 polycarbonate was injection molded following the same procedure and subjected to the UL-94 test at 1/16". It was found that the polycarbonate blend failed the UL-94 test as a flaming drip resulted.

Although the above example is directed to only a few of the very many variables which can be employed in the practice of the present invention to produce the halogen-free flame retardant aromatic copolymer blends, it should be understood that the present invention is directed to a much broader variety of blends as set forth in the description preceding this example which can include other aromatic polycarbonate copolymers having formula (2) units or mixtures of formulas (1) and (2) as well as other diarylsilicon materials as set forth in the description preceding this example.

What is claimed is:

1. A flame retardant halogen-free aromatic polycarbonate comprising (A) an aromatic polycarbonate copolymer consisting essentially of aromatic carbonate units condensed with 0.5 to 5 mole % of silarylene units based on the total moles of the aromatic carbonate units and silylarylene units selected from the class consisting of silylarylenecarbonyl units of the formula

silylaryleneimide units of the formula

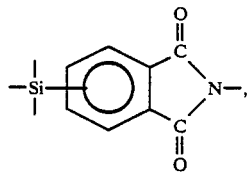

and mixtures thereof and, (B) an amount of a triarylsilicon material having the formula

which is effective for imparting sufficient flame retardancy to provide a 1/16" or greater injection molded test sample capable of satisfying the V-O requirements of UL-94, where the unsatisfied valence bonds of the silicon atoms of the silylaryl carbonyl units and the silylaryleneimide units, can be satisfied by $C_{(1-13)}$ monovalent organic radicals, oxygen atoms or mixture thereof, $R^2$ is selected from $C_{(6-13)}$ monovalent aromatic organic radicals and Y is a member selected from $-C_2H_3$, $-H$, $-Si(R^2)_3$ and $-OSi(R^2)_3$.

2. A flame retardant halogen-free injection moldable aromatic polycarbonate copolymer blend in accordance with claim 1, where the aromatic polycarbonate copolymer has condensed silylphenylenecarbonyl units.

3. A flame retardant halogen-free injection moldable aromatic polycarbonate copolymer blend in accordance with claim 1, where the aromatic polycarbonate copolymer has condensed silylphthalimide units.

4. A flame retardant halogen-free injection moldable aromatic polycarbonate copolymer blend in accordance with claim 1, where the triarylsilicon material is hexaphenyldisiloxane.

5. A transparent flame retardant halogen-free injection moldable aromatic polycarbonate blend in accordance with claim 1.

6. An aromatic polycarbonate copolymer in accordance with claim 1, where the aromatic carbonate units are bisphenol A carbonate units.

* * * * *